(12) United States Patent
Vlachou et al.

(10) Patent No.: US 11,051,206 B2
(45) Date of Patent: Jun. 29, 2021

(54) WI-FI OPTIMIZATION FOR UNTETHERED MULTI-USER VIRTUAL REALITY

(71) Applicant: Hewlett Packard Enterprise Development LP, Houston, TX (US)

(72) Inventors: Christina Vlachou, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 121 days.

(21) Appl. No.: 16/176,193

(22) Filed: Oct. 31, 2018

(65) Prior Publication Data

US 2020/0137622 A1 Apr. 30, 2020

(51) Int. Cl.
| | | |
|---|---|---|
| *H04J 13/00* | (2011.01) | |
| *H04W 28/06* | (2009.01) | |
| *G06T 19/00* | (2011.01) | |
| *H04W 4/80* | (2018.01) | |
| *H04L 5/00* | (2006.01) | |
| *H04B 7/0452* | (2017.01) | |

(52) U.S. Cl.
CPC .......... *H04W 28/06* (2013.01); *G06T 19/006* (2013.01); *H04B 7/0452* (2013.01); *H04L 5/0007* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 6,118,456 A | 9/2000 | Cooper | |
| 8,446,411 B2 | 5/2013 | Gerhard et al. | |
| 9,215,293 B2 | 12/2015 | Miller | |
| 9,351,315 B2 | 5/2016 | Bao et al. | |
| 2007/0053428 A1 | 3/2007 | Saleem et al. | |
| 2013/0215115 A1 | 8/2013 | Jenkins | |
| 2016/0101356 A1 | 4/2016 | Kuo et al. | |
| 2017/0227765 A1 | 8/2017 | Mannou et al. | |
| 2019/0318488 A1* | 10/2019 | Lim .................. | G06K 9/00208 |
| 2020/0037029 A1 | 1/2020 | He et al. | |

OTHER PUBLICATIONS

Ahmadi, H. et al, Adaptive Multicast Streaming of Virtual Reality Content to Mobile Users, (Research Paper), Oct. 23-27, 2017, 9 Pgs.

Ahn, J. et al., Virtual Reality—wireless Local Area Network: Wireless Connection-oriented Virtual Reality Architecture for Next-generation Virtual Reality Devices, (Research Paper), Jan. 3, 2018, 16 Pgs.

(Continued)

*Primary Examiner* — Willie J Daniel, Jr.
(74) *Attorney, Agent, or Firm* — Hewlett Packard Enterprise Patent Depanment

(57) ABSTRACT

Example method includes receiving, at an access point (AP), a plurality of virtual reality (VR) data from each of a plurality untethered mobile devices associated with a multi-user VR environment, receiving, at the AP, an indication of an atomic data block size for data to be transmitted to one or more of the plurality of untethered mobile devices, reducing, by the AP and based on the indication, a transmission duration of a VR data block to be transmitted to one or more of the plurality of untethered mobile devices.

20 Claims, 7 Drawing Sheets

(56) References Cited

OTHER PUBLICATIONS

Hosseini, M. et al., Adaptive 360 VR Video Streaming: Divide and Conquer!, (Research Paper), Nov. 17, 2017, 6 Pgs.
Boos et al., "Flashback: Immersive virtual reality on mobile devices via rendering memoization." Proceedings of the 14th Annual International Conference on Mobile Systems, Applications, and Services. ACM, 2016, pp. 291-304.
Lai et al. "Furion: Engineering High-Quality Immersive Virtual Reality on Today's Mobile Devices," Proceedings of the 23rd Annual International Conference on Mobile Computing and Networking. ACM, 2017, pp. 409-421.

* cited by examiner

WI-FI OPTIMIZATION FOR UNTETHERED MULTI-USER VIRTUAL REALITY

BACKGROUND

Virtual Reality (VR) is becoming important in enterprise environments with many applications in education, training, collaborative meetings, and product design. Enterprises are embracing VR in order to reduce production costs, travel costs, maintenance costs, and training costs while also raising the value of remote interactions. The trend is well supported both by specialized VR hardware for business and by VR software platforms for collaborative projects or meeting rooms.

However, there are still many challenges to wider adoption of VR in enterprise environments, where multiple users simultaneously collaborate or train in the same environment. In particular, improvements to the ability of individuals to use their untethered mobile devices are needed.

BRIEF DESCRIPTION OF THE DRAWINGS

The following detailed description references the drawings, wherein.

DETAILED DESCRIPTION

The challenges to the widespread use of enterprise VR are manifold: (i) tethered head-mounted displays are not safe and do not enable mobility (ii) stringent network requirements for delay and data rates of untethered high-quality VR are not supported by state-of-the-art wireless networks (iii) intensive GPU operations drain batteries of mobile devices; (iv) limited GPU capabilities limit high-quality experience. Generally, the present disclosure describes a method, system, and computer readable medium that resolves the above presented challenges and provides a high quality of experience for multi-user virtual reality (VR) to users on untethered mobile devices.

In general, in one embodiment, a method includes receiving, at an access point (AP), a plurality of virtual reality (VR) data from each of a plurality untethered mobile devices associated with a multi-user VR environment, receiving, at the AP, an indication of an atomic data block size for data to be transmitted to one or more of the plurality of untethered mobile devices, reducing, by the AP and based on the indication, a transmission duration of a VR data block to be transmitted to one or more of the plurality of untethered mobile devices.

In general, in one embodiment, an access point includes a memory, a central processing unit (CPU) executing instructions from the memory to: receive a plurality of virtual reality (VR) data from each of a plurality untethered mobile devices associated with a multi-user VR environment, receive an indication of an atomic data block size for data to be transmitted to one or more of the plurality of untethered mobile devices, reduce, based on the indication, a transmission duration of a VR data block to be transmitted to one or more of the plurality of untethered mobile devices.

In general, in one embodiment, a non-transitory computer-readable storage medium encoded with instructions executable by a main processor of central processing unit (CPU) of a wireless access point (WAP), the CPU comprising at least the main processor and a plurality of co-processors, the non-transitory machine-readable storage medium comprising instructions to: receive a plurality of virtual reality (VR) data from each of a plurality untethered mobile devices associated with a multi-user VR environment, receive an indication of an atomic data block size for data to be transmitted to one or more of the plurality of untethered mobile devices, reduce, based on the indication, a transmission duration of a VR data block to be transmitted to one or more of the plurality of untethered mobile devices.

Figure 1:
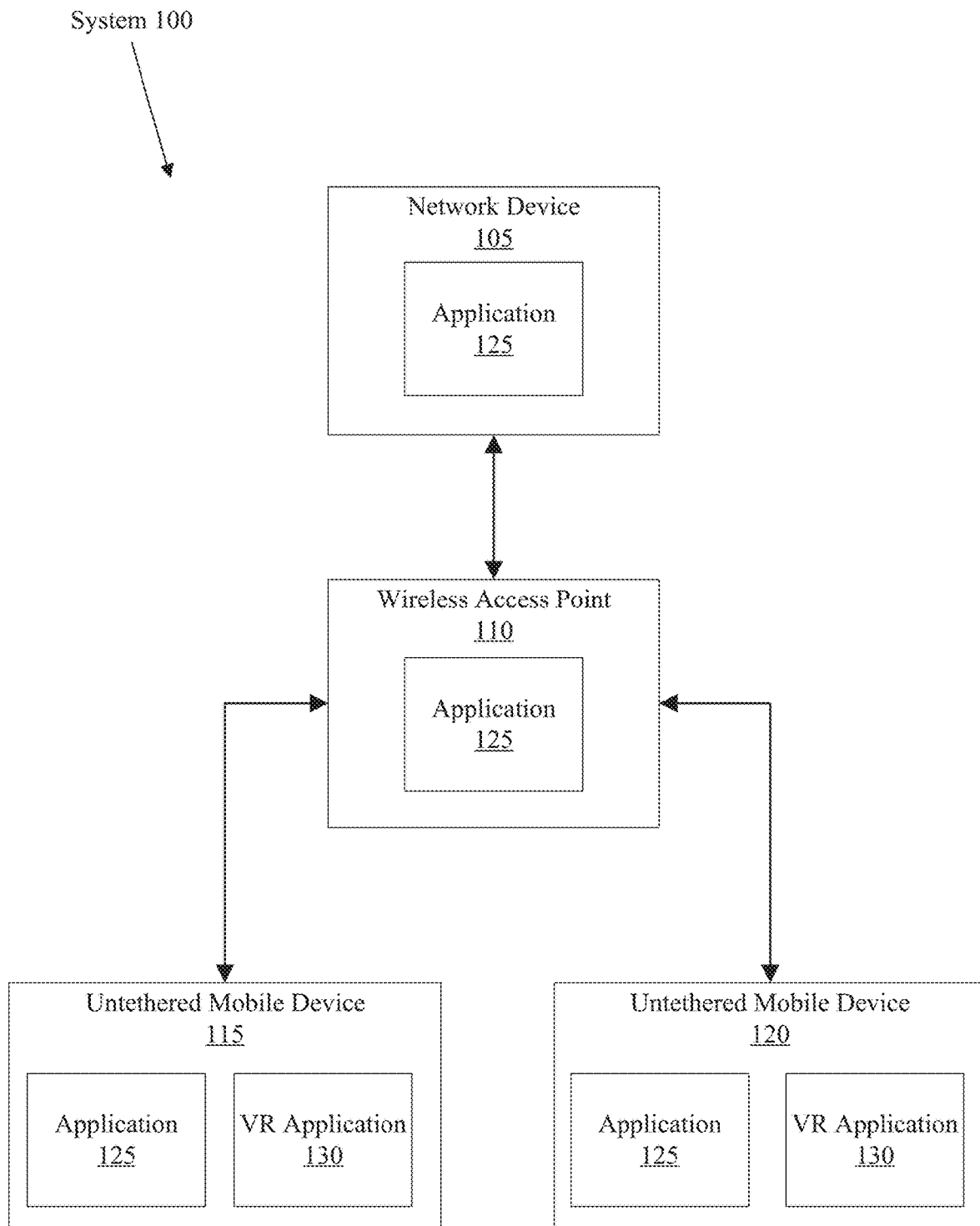
FIG. 1 is a block diagram of an example system architecture for untethered multi-user virtual reality.

Referring now to FIG. 1, system 100 includes network device 105, wireless access point (WAP) 110, and untethered mobile devices 115 and 120. System 100 further includes application 125 and Virtual Reality (VR) application 130.

Network device 105 generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. For example, network device 105 may refer to a network controller that comprises a hardware or a combination of hardware and software that enables connection between client devices and computer networks. In some implementations, network device 105 may refer to a server computing device (e.g., on-premise server, private, public, or hybrid cloud server) that comprises a hardware or a combination of hardware and software that can process and/or display network-related information. In some implementations, network device 105 may refer to an access point acting as a virtual master network controller among a cluster of access points. Usually, network device 105 refers to a server computing device or other device with the necessary computing power to render many frames per second of a VR environment. Network device 105 may include any necessary hardware components (not shown) to perform the inventions disclosed herein, including, but not limited to: processors, graphical processing units (GPUs), memories, display devices, input devices, communications equipment, etc.

Network device 105 executes application 125. Application 125 may be a stand-alone application, may come pre-installed on network device 105 or may have been installed by a user or administrator, may be firmware, and/or may be a module or component of another application or operating system (not shown). Application 125 is also shown in FIG. 1 as executing on wireless access point 110 and untethered mobile devices 115, 120. Application 125 is discussed in more detail below. Network device 105 may also execute other applications (not shown) as needed. Network device 105 is communicatively connected, using wired or wireless connections, to WAP 110.

WAP 110 generally refers to receiving points for any known or convenient wireless access technology which may later become known. Specifically, the term WAP is not intended to be limited to IEEE 802.11-based WAPs. WAPs generally function as an electronic device that is adapted to allow wireless devices to connect to a wired network via various communications standards. WAP 110 may include any necessary hardware components (not shown) to perform the inventions disclosed herein, including, but not limited to: processors, memories, display devices, input devices, communications equipment, etc. WAP 110 may execute application 125 as well as other applications such as VR application 130 (not shown) as needed. WAP 110 is communicatively connected, using a wireless connection, to untethered mobile devices 115 and 120, and communicatively connected to network device 105 using a wired or wireless connection.

Untethered mobile devices 115 and 120 may be any mobile device able to support VR application 130, including, but not limited to: smartphones, tablets, and the like. Untethered mobile devices 115 and 120 may include any necessary hardware components (not shown) to perform the inventions disclosed herein, including, but not limited to: processors, memories, display devices, input devices, communications equipment, etc. Generally, untethered mobile devices 115 and 120 will be owned or controlled by the user, and used in a Bring Your Own Device (BYOD) context to allow for VR application use in enterprise environments. However, untethered mobile devices 115 and 120 may be owned by an employer or third party, may be provided by an entity providing VR services, or may be used or controlled by any other suitable entities.

Untethered mobile devices 115 and 120 execute VR application 130. VR application 130 may be any VR application, used for any purpose including, but not limited to: games, meetings, networking, social media, entertainment, training, productivity, etc. VR application 130 may be created by a third party or other suitable entity, may come pre-installed on untethered mobile devices 115 and 120, or may be installed by a user or administrator of untethered mobile devices 115 and 120. Application 125 may provide the functionalities described below transparently to VR application 130, or may integrate or communicate with VR application 130 in any suitable manner to provide the functionalities below.

VR application 130 supports multiple users simultaneously and allows the users to interact with objects and/or other users. VR application 130 may divide the visual elements into static and dynamic elements, such as background or environmental images and objects. Generally, the objects may be directly interacted with, while the static images or background may not be directly changed by user actions. VR application 130 may support any number of objects and users, although the more users and objects support the greater the processing and bandwidth demands. The objects demand a higher priority due to their interactive nature—a delay in processing interactions with objects is very noticeable in a VR environment in the form of lag.

Application 125 is an application, module, component, add-on, or other software element that provides a variety of functionalities to greatly improve the quality of experience of multi-user VR on untethered mobile devices. Although application 125 is depicted in FIG. 1 as executing on network device 105, WAP 110, and untethered mobile devices 115 and 120, there may be different version of application 125 depending on the use. For example, a server version of application 125 may be deployed on network device 105, an access point version of application 125 may be deployed on WAP 110, and a client version of application 125 may be deployed on untethered mobile devices 115 and 120. Alternatively, a same version may be deployed on different devices. All, or portions, of the functionality described for application may be provided to each of the devices on which application 125 is installed.

Application 125 comprises instructions or programming to pre-render frames for a VR environment in multiple qualities. Application 125 may utilize or rely on VR application 130 to assist or perform the pre-rendering, as needed. Generally, the entire VR environment is pre-rendered, and may be pre-rendered by any device with sufficient computing power to perform the pre-rendering, such as a server or other network device. In other words, the full 360 degree view from each possible user position may be pre-rendered offline. An advantage of performing the pre-rendering on a server or other network device is that the untethered mobile devices no longer need to perform the rendering themselves, thereby saving battery power and processing time, and improving the quality of experience. The frames of the environment that are pre-rendered are static. In other words, the frames consist of background or other static elements that are not changeable by users in the VR environment. Alternatively, the environment or scenes depicted in the frames may offer limited interaction. Due to the static nature of the frames that are pre-rendered, the server may pre-render the frames once and subsequently provide the frames to many different users of the VR application. The frames may be pre-rendered in any number of different qualities. For example, the frames may be rendered at a low, medium, and high quality. That way, if one untethered mobile device can support a higher quality than another, the frames may be provided at the appropriate quality level to each untethered mobile device. Depending on the type of VR application, expected number of users in the VR application, density of interactive objects, known bandwidth or computing resource limitations, or any other suitable factors, the amount of qualities for pre-rendering may be adjusted. The amount of qualities for pre-rendering may be predetermined or may be dynamically adjusted in any suitable manner.

Additionally, application 125 may pre-render interactive objects in two different formats: rendered and unrendered. Effectively, the rendered format is a video stream with each frame rendering the object from a particular view, generated in a similar manner to the pre-render static environmental frames described above. The rendered objects are easy to be processed by a client device by requires continuous fetching of the frames as the viewpoint changes which incurs additional network delay. Alternatively, a client device could cache all frames of a rendered interactive object if sufficient memory is available. The unrendered format contains raw three dimensional meshes and textures. This, of course, requires more processing power of the client device but also consumes far less bandwidth than the rendered version. Both the rendered and unrendered versions of interactive objects may be generated, and subsequently stored as discussed below, by the network device or other suitable device.

Application 125 comprises instructions or programming to store pre-rendered frames in multiple qualities. The frames may be stored in any format and in any manner now known or later developed. The frames may be compressed and/or encrypted before storage in any suitable manner. The frames may be stored in any suitable location, such as a cache, memory, hard drive, etc. The frames may be stored on a single physical device or across multiple physical devices. Generally, the pre-rendered frames will be stored in a cache of a network device, such as a server computing device or other similar device, that rendered the frames.

Application 125 comprises instructions or programming to send and receive positional information associated with a user location in the VR environment. The positional information may be sent and received in any format using any suitable transmission method. For example, the positional information may be six degrees of freedom (6DoF) and include the orientation of the user. This positional information may be used by application 125 to determine the field of view of the particular user in the VR environment, and thereby allow application 125 to determine what frames should be transmitted to the particular user. The determination of what frames to transmit may be made in any manner now known or later developed.

Application 125 comprises instructions or programming to transmit stored pre-rendered frames to untethered mobile devices. Generally, the frames are transmitted from a server or other networking device that stores the pre-rendered frames, through a wireless access point, to an untethered mobile device, although the disclosure is not so limited. Any suitable device may transmit frames in any order to any other device or devices. The frames may be transmitted in any format using any method of transmission now known or later developed. The frames may be transmitted in a compressed or uncompressed state, and/or an encrypted or unencrypted state. The frames may be transmitted in any quality, and the quality at which frames are transmitted may change dynamically on a per-user basis. For example, frames may change from being transmitted at a high quality to a low quality for a first untethered mobile device while simultaneously frames transmitted to a different untethered mobile devices are changing from transmission at a low quality to a high quality. Application 125 may transmit frames to any number of untethered mobile devices. The transmission of frames may be based on receiving positional information associated with the untethered mobile device. Different frames may be sent to different users simultaneously or contemporaneously. For example, if a first user is viewing a mountain in the VR environment while a second user is viewing a lake in the VR environment, then different frames would be sent to each user. A change in transmission quality may be based on any suitable factors, such as available bandwidth as discussed below.

Application 125 comprises instructions or programming to determine available bandwidth information for untethered mobile devices, and to send and/or receive available bandwidth information for untethered mobile devices. Available bandwidth may be determined or calculated by tracking a variety of information related to particular untethered mobile devices. For instance, each of the: physical layer (PHY) transmission rate, average subframe error rate (SFER), channel state information (CSI), protocol data units (PDU) per second, and average MU-MIMO group size may be tracked and stored on a per-untethered mobile device basis. This data may be collected on the untethered mobile device and/or on the WAP. Additionally, any other data may be tracked, stored, and/or used in determining available bandwidth. Any collected data may be sent, in any format, to a suitable location for processing and/or storage, such as a server or other network device.

A closely related concept to available bandwidth is the overall quality of experience of a user in VR. Generally, VR applications have a minimum quality of experience that is necessary to maintain—otherwise users may get dizzy or disoriented. For example, a server needs to transmit rendered background frames and object textures to all local clients through Wi-Fi links. According to recent studies, this requires approximately 100 Megabits per second (Mbps) per client. Currently, Wi-Fi APs support up to 500 Mbps downlink throughput per client. Additionally, a minimum of 60 Frames per Second (FPS) is needed for an adequate quality of experience.

Figure 2A:
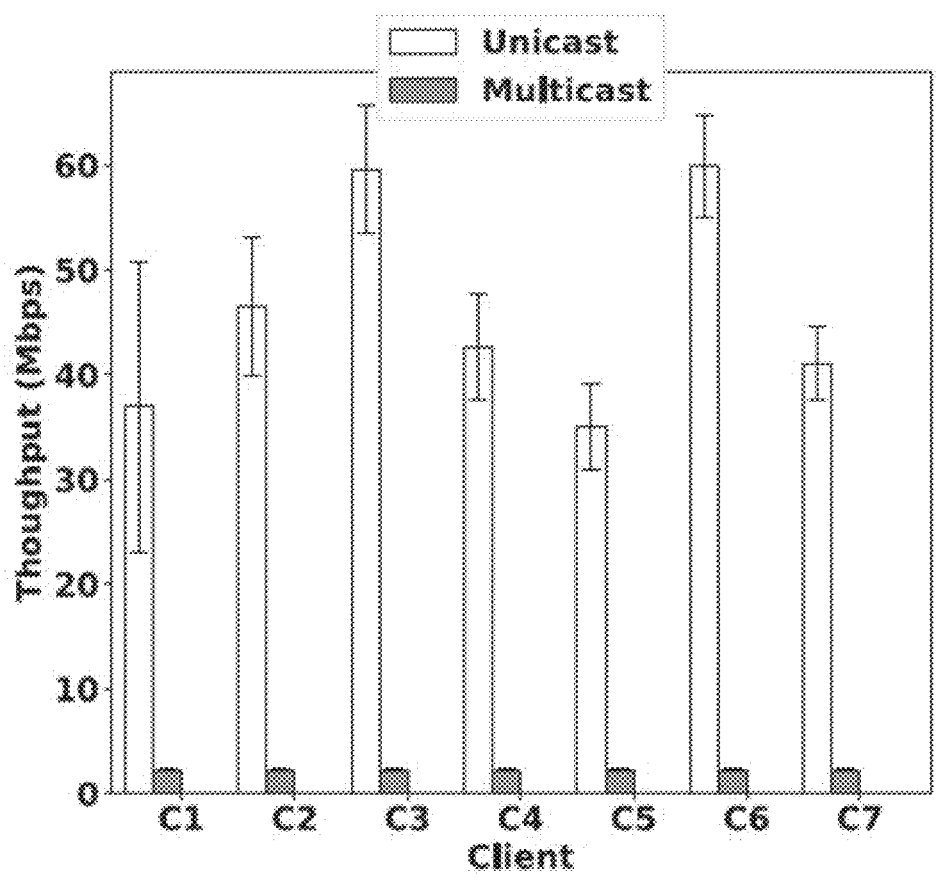
FIG. 2A and FIG. 2B show example results for untethered multi-user virtual reality.

FIG. 2A shows example results of throughput, in Mbps, for both Multi-User Multiple Input and Multiple Output (MU-MIMO) unicast and multicast techniques. Large gains may be had through utilizing unicast techniques, and are addressed below.

In particular Algorithm 1, shown in Table 1 below, may be used, in part, by application 125 to calculate the optimal quality of experience for a given user in the VR environment.

Algorithm 1 Algorithm for adaptive rendering at Step t

1:    Contants: Throughput requirements for minimum, average, best quality, VR, MAC overheads
2:    Input: Client's i UDP estimated throughput $P_i^t$, $1 \leq i \leq N$. Total network throughput $T^t$ or average MU-MIMO group size $g^t$.
3:    Output: $Q_i^t$ quality for user i, represented as bits per second required
4:    Goal: Maximize network utility, such as total throughput
5:    Constraints: 1) Wi-Fi bandwidth per client $<< P_i^t$
      2) Total network bandwidth $T^t$ or airtime
6:    Solve optimization: max $\Sigma \log_{1 \leq j \leq N} (Q_i)$ (or other utility function)
7:         subject to $\Sigma_{1 \leq j \leq N} Q_i^t < T^t$
8:         or subject to $Q_i^t < g^t P_i^t / N$ As discussed above, application 125 may gather statistics including average PHY rate $\phi_i$, average subframe error rate (SFER) $\sigma_i$ per client i, and the average size of SU/MU-MIMO groups $g_i$. Then, application 125 can compute the single link maximum achievable throughput as $P_i = \phi_i(1-\sigma_i)(1-MAC_{overheads})$. As $P_i$ indicates only the achievable PHY rate in a setting of N stations, we need to account for the fact that stations share equitably the medium, but also that we have some gains when MU-MIMO groups of 2-4 users are formed. Hence, we estimate the final User Datagram Protocol (UDP) throughput of client i as $g_i P_i^t \cdot N$. $P_i^t$ may be computed at the WAP, while $g_i$ may be computed at server, WAP, or network device, or other suitable location. On the untethered mobile device, the number of received VR frames is periodically recorded (e.g., every 100-500 milliseconds). The number of received VR frames is sent to the server or network device via application 125. Assuming that the network is saturated, the total network throughput T at a given time, is the sum of throughput of all received feedback.

Returning to FIG. 1, application 125 comprises instructions or programming to determine whether an available bandwidth satisfies a threshold. The threshold may be set to any amount, may be based on an algorithm (such as Algorithm 1), may vary dynamically, and/or may be set in any other manner. The threshold may be used to determine when a higher or lower quality of frame should be transmitted to the untethered mobile device. Multiple thresholds may be used, such as one per quality level of pre-rendered frames, or any other suitable amount. Thresholds may also be used for other determinations, such as when to increase or decrease a polygon complexity of a texture, or for any other purpose.

Application 125 comprises instructions or programming to train a model to predict optimal polygon complexity. Polygon complex refers to the textures used on objects, and the numbers of vertices used to represent those objects. Using real data from VR applications, a machine learning model may be built that takes the number of objects rendered and the distance to each of the objects as inputs, and gives as output the optimal polygon complexity for each of the objects. The complexity may vary for each object and may vary based on the particular type of untethered mobile device that is displaying the VR environment. Any suitable machine learning method now known or later developed may be used to create the trained model. With enough data points, many useful conclusion may be drawn.

Figure 2B:
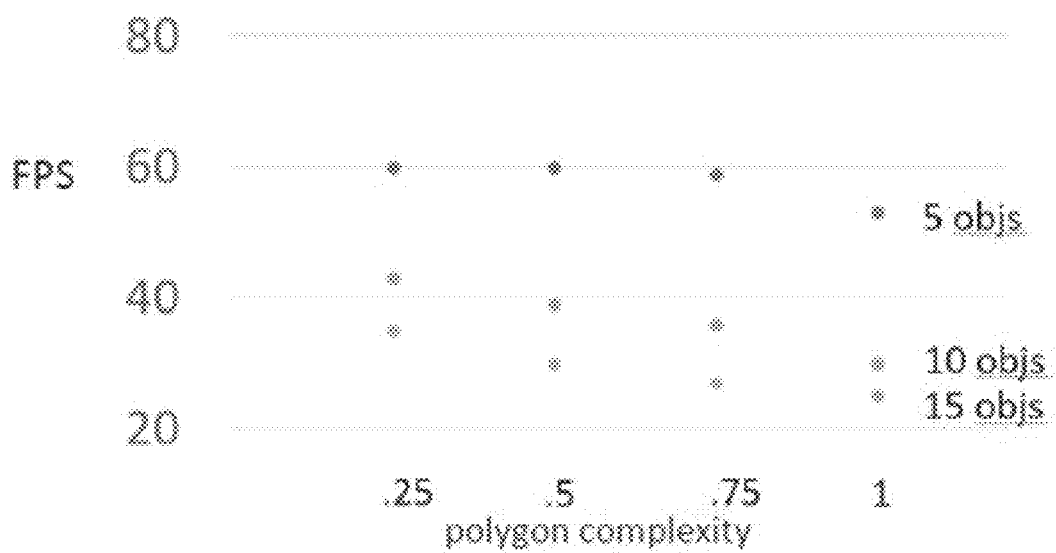

FIG. 2B shows example results of the trade off in polygon complexity vs the frame rate for a given number of interactive objects. As FIG. 2B shows, more objects reduces frame rates, and lower polygon complexities increases framerates.

Figure 3:
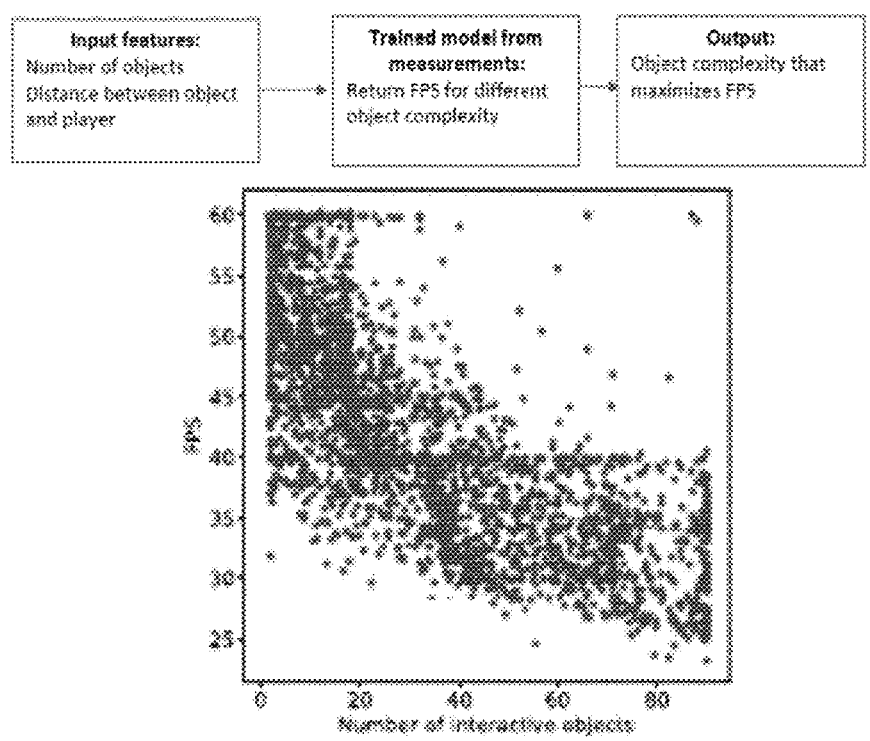
FIG. 3 shows example input, output, and results of modeling polygon complexity.

Likewise, FIG. 3 shows the input, measurements, and output of the model. FIG. 3 also shows the results of tests run by the inventors with the FPS on the Y-axis, and the number of interactive objects on the X-axis.

Returning to FIG. 1, application 125 comprises instructions or programming to optimize multi-user multiple input multiple output (MU-MIMO) grouping for VR applications. In particular, application 125 enables two particular optimizations: blacklisting of groups with SFER that yields delays above a threshold amount and informing the WAP 110 about the size of the atomic data blocks to be transmitted. When blacklisting groups with SFER delays above a threshold, the threshold amount may be set by the network device at any suitable amount, and may change dynamically as needed. By informing the WAP 110 about the size of atomic data blocks the WAP 110 may make better decisions regarding frame aggregation, such as transmission duration. In particular, the transmission duration may be reduced to maintain the proper scheduling granularity without delaying other users. To further reduce delays, VR traffic should not use any delay aggregation algorithms, such as waiting for MU-MIMO groups to be formed or more data to be aggregated in a single frame transmission.

Application 125 comprises instructions or programming to account for users' real world mobility when using a VR application. While using a VR application, users' may move—such as moving their head with a device attached to their head/headset, or physically walking around a room. This movement can affect the SFER. This can have unintended negative impacts on the PHY rate control, since a historical average of SFER is commonly used for PHY rate control. However, application 125 is able to detect and predict the mobility of the user based on the context of VR interactions performed by the user. This data can then be used by application 125 and WAP 110 to prevent lost packets due to mobility incurred fading. Additionally, this same data that is used to control PHY rate (i.e., rate control) may also be used to make decisions regarding MU-MIMO grouping.

Application 125 comprises instructions or programming to reduce uplink delays. Application 125 can cause WAP 110 to add a short delay or silent slots when the queue length of downlink traffic is short to facilitate uplink transmission. In particular, this is helpful in transmitting user's metadata, since the metadata is typically only a few hundred bytes or less. This short delay or silent slot reduces the delays from carrier-sense multiple access/collision avoidance (CSMA/CA) or collisions. The frequency and duration of such silent slots or short delays may be based on any data available to application 125.

Application 125 comprises instructions or programming to enable WAP 110 to assign uplink slots. In the next-generation orthogonal frequency-division multiple access (OFDMA), transmissions are completely controlled by WAP 110, which, when collaborating with application 125, can schedule periodically all clients with small uplink metadata on a single frame transmission. In this case, clients are completely in sync and transmitting metadata simultaneously without any collisions (contrary to 802.11ac). Application 125 can inform WAP 110 about the uplink resource allocation decisions, which depend on the bandwidth, the number of clients, the metadata size, and the users' viewport movement dynamics. WAP 110 then assigns uplink slots without requiring buffer status reports.

Application 125 comprises instructions or programming to schedule uplink metadata to be sent using an alternative medium. In particular, Bluetooth can be used to transmit user metadata as Bluetooth can support the data rate demand of VR and the multiple concurrent connections needed.

Figure 4:
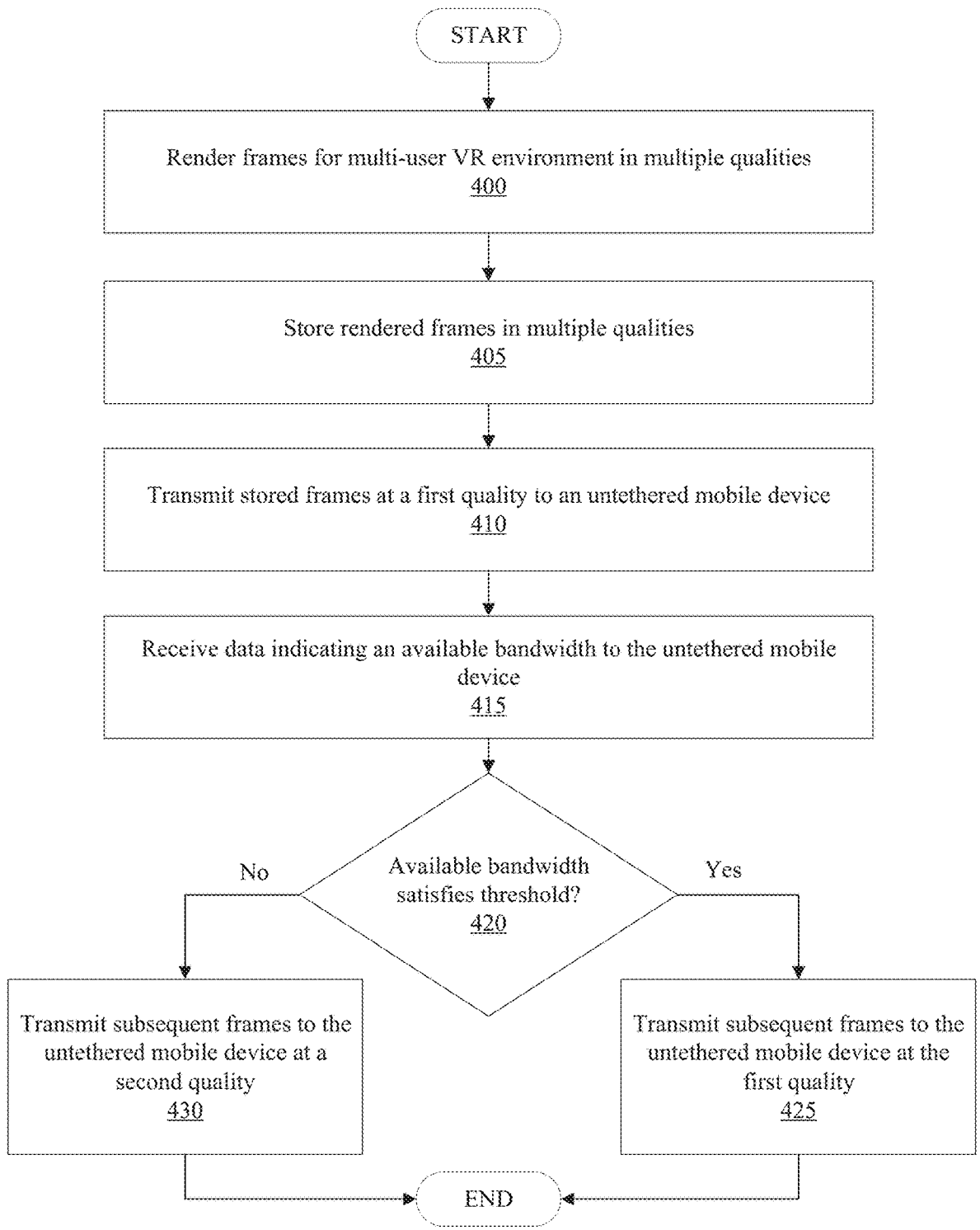
FIG. 4 is a flowchart of an example process of adaptive rendering for untethered multi-user virtual reality.

FIG. 4 is a flowchart of an example process of adaptive rendering for untethered multi-user VR. FIG. 4 is intended to show one example of the method, and the disclosure should not be limited to the particular steps described in FIG. 4. Although the steps of FIG. 4 are shown in an order, the steps may be performed in any order, at any time, and/or repeated, and are thus not limited to the order shown and described in FIG. 4.

In step 400, frames for a multi-user VR environment are pre-rendered in multiple qualities. The frames may be pre-rendered at any suitable time, such as upon launch of an instance of VR, during a loading screen, as users move about an environment or zone, etc. The frames may be pre-rendered in any amount of different qualities, such as 2, 3, 5, or more. The qualities can be any qualities. For example, a low, medium, and high quality may be used in one embodiment, while in another only a medium and high quality may be used. The qualities may be defined in any suitable manner, such as by the pixel or polygon density, the size (such as in megabytes) of the frames, or in any other manner. The frames may be pre-rendered in any suitable manner or format. The pre-rendered frames may include static background or environmental scenes that are not able to be interacted with by the users of the VR application.

In step 405, the pre-rendered frames are stored in multiple qualities. The pre-rendered frames may be stored in any suitable location, such as a cache or caches, and maybe stored in one device or across multiple devices. The pre-rendered frames may be stored in any format, using any compression technique now known or later developed.

In step 410, stored frames are transmitted at a first quality to an untethered mobile device. The frames may be transmitted using Wi-Fi or any other suitable method. The first quality may be any quality. For example, initial frames may be sent at a low quality and slowly ramped up to a higher quality. Alternatively, initial frames may be sent at a high quality or any other quality. The frames may be sent in a compressed state or an uncompressed state, based on any suitable factors.

In step 415, data is received indicating an available bandwidth to the untethered mobile device. The data may be received from one or multiple sources. The data may be any type of data related to the available bandwidth. For example, the data may include, but is not limited to: PHY transmission rate, average SFER, CSI, PDU per second, and average MU-MIMO group size.

In step 420, a determination is made whether the available bandwidth satisfies a threshold. If the threshold is not satisfied, the method proceeds to step 430. If the threshold is satisfied, the method proceeds to step 425. The determination may be made in any suitable manner. The threshold(s) may be set to any amount, by any entity, using any method or basis now known or later developed.

In step 425, subsequent frames are transmitted to the untethered mobile device at the first quality. In step 425, the threshold has been satisfied and transmission of frames continues at the first quality. After step 425, the method ends.

In step 430, subsequent frames are transmitted to the untethered mobile device at a second quality. In step 430, the threshold has not been satisfied, so the transmission of frames has swapped to a second quality. The second quality may be lower than the first quality, such as in the instance where there is insufficient bandwidth to support the first (higher) quality. Alternatively, the second quality may be higher than the first, such as in the instance when the threshold is the minimum bandwidth needed to support the second (higher) quality.

Generally, the steps of FIG. 4 may be performed continuously as a VR application is used. In particular, steps 415, 420, 425, and/or 430 may be performed continuously to ensure that the optimal experience is had by each user in the VR environment.

Figure 5:
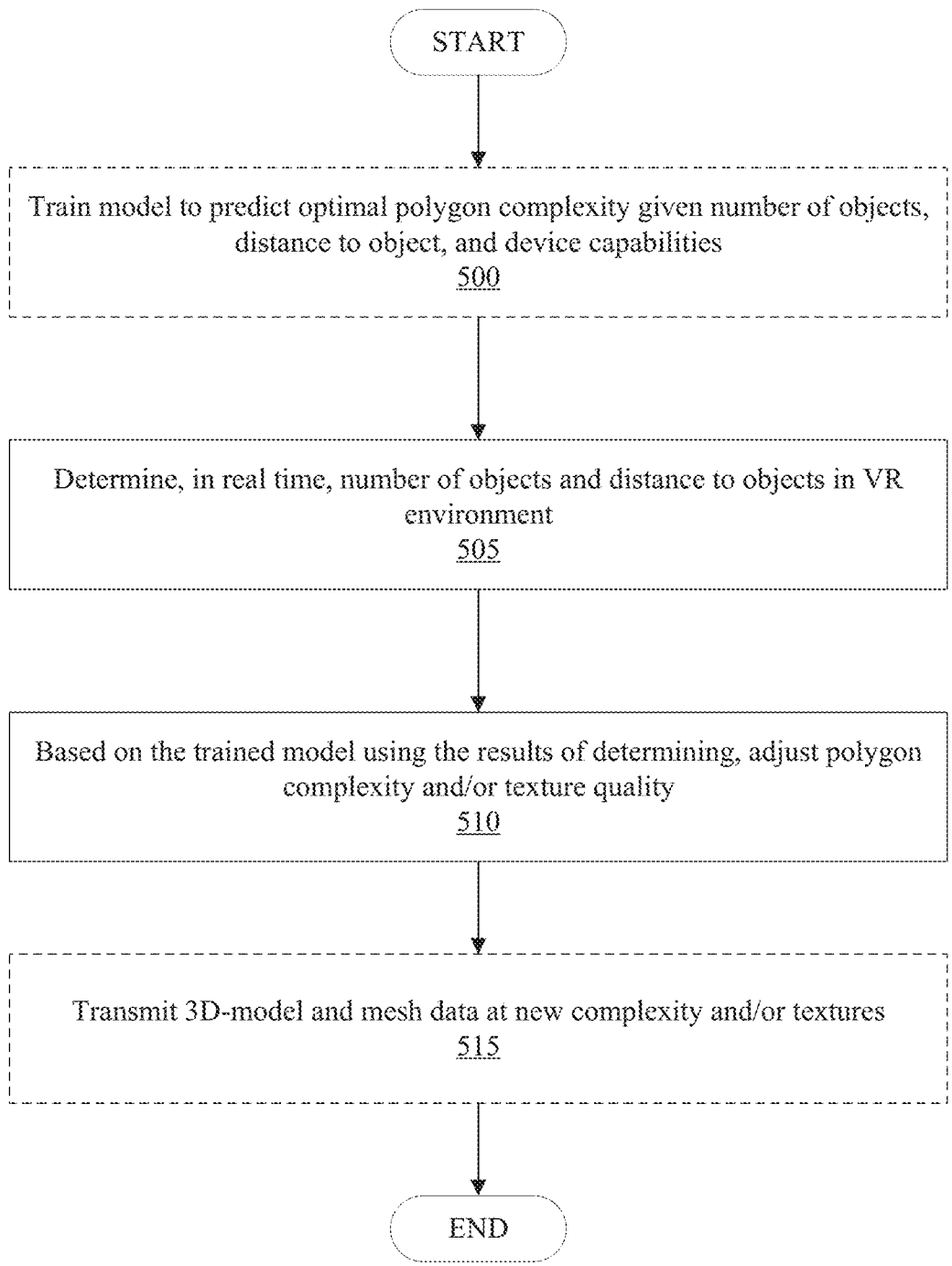
FIG. 5 is a flowchart of an example process of adaptive rendering for untethered multi-user virtual reality.

FIG. 5 is a flowchart of an example process of adaptive rendering for untethered multi-user VR. FIG. 5 is intended to show one example of the method, and the disclosure should not be limited to the particular steps described in FIG. 5. Although the steps of FIG. 5 are shown in an order, the steps may be performed in any order, at any time, and/or repeated, and are thus not limited to the order shown and described in FIG. 5.

In step 500, a model is trained to predict optimal polygon complexity based on the number of objects, the distance to the objects, and the device capabilities. The model may take as input data relating to different VR situations with varying numbers of objects and distances to the objects. Any number of objects may be present at any distances. The data may include the same situations with varying levels of complexity, such as 1, 0.75, 0.5, and 0.25 polygon density. Using the same situations at different polygon densities may aid in training the model. The model is not so limited to only account for polygon density, and any variables relating to the quality of images may be varied and/or accounted for. The device capabilities may take into account any capabilities of the untethered mobile device including, but not limited to: CPU, GPU, memory, battery, etc. As indicated by the dotted line, step 500 may be performed in advance of a user beginning a particular VR session.

In step 505, the number of objects in the VR environment and the distance to the objects is determined in real time. The determination may be made in any suitable manner. The determinations is subsequently used as inputs to the trained model. Step 505 may be performed continuously while a user is in a VR environment. Additionally, step 505 may be performed for each user simultaneously so that each user can experience the optimal VR experience.

In step 510, the polygon complexity and/or texture quality of objects is adjusted based on the output of the trained model using the determined number of objects, distance to the objects, and device capabilities. The complexity may be increased or decreased, or may stay the same. The polygon complexity and the texture quality may be adjusted independently, or together as needed. The adjustment may be made in any suitable manner.

In step 515, new 3D-model and mesh data is transmitted at the new polygon complexity and/or textures. The new polygon complexity or textures are based on the output of the trained model, as discussed in step 510. Step 515 is optional, as some clients may have multiple versions of objects locally stored and, thus, no new 3D-model, mesh data, or texture data may be needed for a client to switch between different polygonal complexities or textures. After step 515, the method ends.

Figure 6:
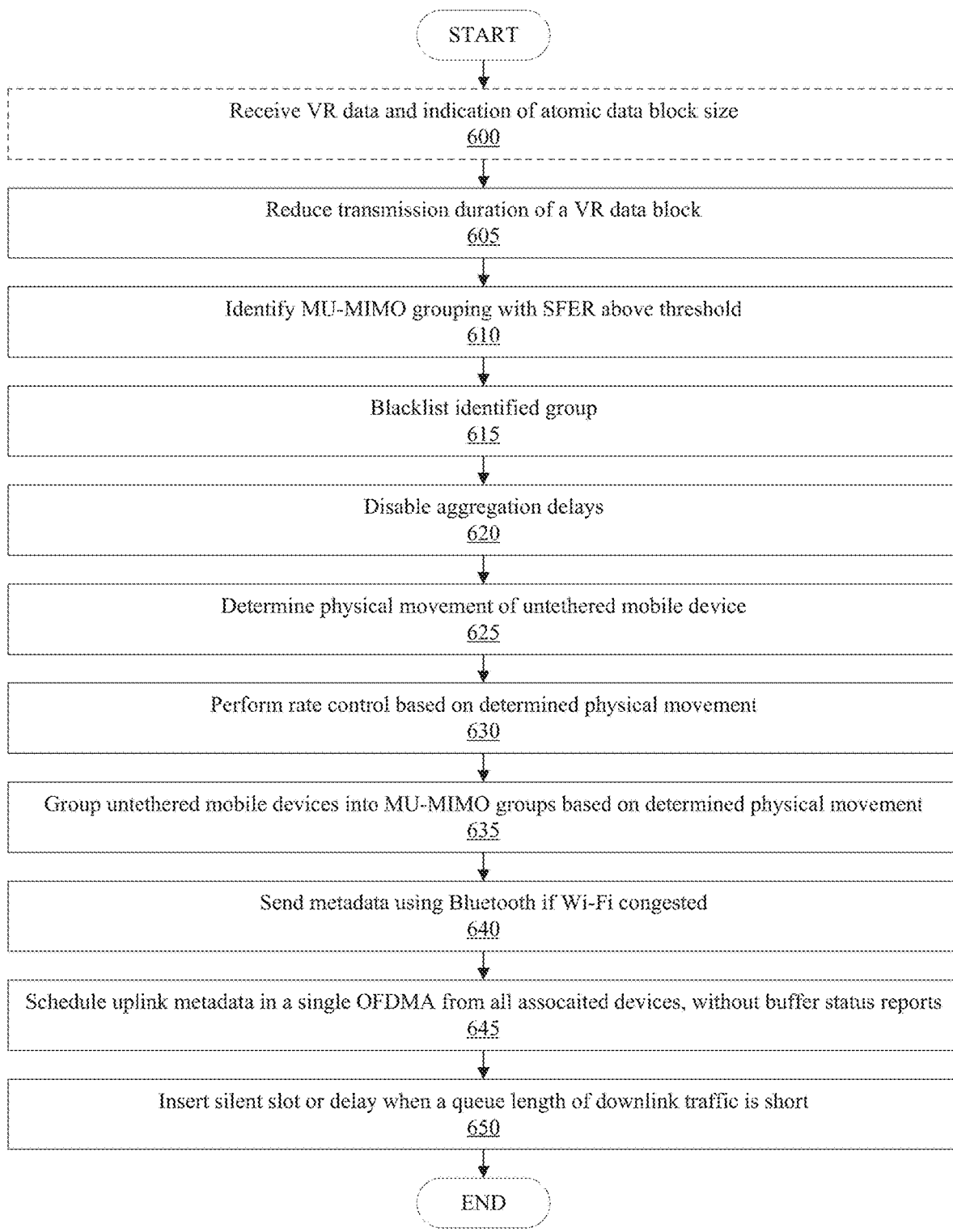
FIG. 6 is a flowchart of an example process of Wi-Fi optimization for untethered multi-user virtual reality.

FIG. 6 is a flowchart of an example process of Wi-Fi optimization for untethered multi-user VR. FIG. 6 is intended to show one example of the method, and the disclosure should not be limited to the particular steps described in FIG. 6. Although the steps of FIG. 6 are shown in an order, the steps may be performed in any order, at any time, and/or repeated, and are thus not limited to the order shown and described in FIG. 6.

In step 600, VR data is received and an indication of atomic data block size is received. The VR data may be received from any suitable source, such as a network device or an untethered mobile device. The VR data may be of any type or format. Additionally, an indication of the atomic data block size is received. The indication is generally received from a network device, but may also be received from any other suitable source. The VR data and indication of atomic data block size may be received by a wireless access point or other suitable device.

In step 605, transmission duration of a VR data block is reduced. The transmission duration may be reduced by any amount. Alternatively, the transmission duration could be increased. Generally, by shortening the transmission duration fitting a VR atomic data block, a lower delay and a greater bandwidth may be achieved.

In step 610, an MU-MIMO grouping with SFER above a threshold amount is identified. The grouping may be identified in any suitable manner. The threshold amount may be set to any amount by any suitable entity at any time. The threshold amount may vary dynamically based on any suitable factors.

In step 615, the identified group is blacklisted. The identified group may be blacklisted in any manner. By blacklisting, the wireless access point will no longer group those untethered mobile devices together, which should result in better latency and performance for those untethered mobile devices.

In step 620, delay-aggregation algorithms are disabled for VR traffic. This means that WAP does not wait for more data to come for a certain station (i.e., untethered mobile device) or for more stations to group into MU-MIMO. Instead, the wireless access point transmits the data (VR atomic data block) immediately. This reduces latency and improves the VR experience.

In step 625, physical movement of an untethered mobile device is determined. The physical movement of an untethered mobile device may be determined in any suitable manner. For example, the untethered mobile device may collect sensor data and relay that sensor data to an access point or network device, thereby indicating the physical movement of the untethered mobile device. The movement may be as specific or as general as needed, and the specificity of the data may vary dynamically. Additionally, the movement of the untethered mobile device may be predicted or anticipated based on any available information and/or models.

In step 630, rate control is performed based on the determined physical movement. The rate control may involve anticipating an increase in the SFER. By anticipating an increase, some lost packets can be prevented. The rate control steps performed based on the determined physical movement may be any steps.

In step 635, untethered mobile devices are grouped into MU-MIMO groups based on determined physical movement. The untethered mobile devices may be grouped into MU-MIMO groups in any manner now known or later developed. The specific groupings used or parameters used to group untethered mobile devices may be any suitable groupings and/or parameters.

In step 640, metadata is sent using Bluetooth. By using a side channel (i.e., Bluetooth), the latency for sending uplink data may be reduced. Generally, there may be delays when sending metadata over Wi-Fi since so much other VR data is being transmitted over Wi-Fi. Bluetooth, however, has the bandwidth and multiple concurrent connection capacity needed to support sending user metadata through Bluetooth. The metadata may be sent in any manner now known or later developed. Alternative communication methods may also be used, such as ZigBee, or any other communication methods now known or later developed. Generally, Bluetooth or other suitable side channel, will be used when Wi-Fi is congested and/or when better latency can be achieved through the use of the side channel.

In step 645, uplink metadata can be scheduled to use a single OFDMA for all associated devices without buffer status reports. In particular, this is applicable to 802.1 lax, although could also be used in other standards or applications not yet developed. The WAP uses next-generation centralized scheduling to reduce delays: it schedules all VR clients in a single uplink OFDMA transmission without requiring buffer status reports. As with the other steps, this reduces latency and improves the VR experience.

In step 650, a silent slot or delay is inserted when a queue length of downlink traffic is short. The length of the silent slot or delay may be long enough to allow for transmission of user metadata, which is typically very small. The silent slot or delay allows for the metadata to be sent faster than it otherwise would have been, thereby reducing latency and improving VR performance/experience.

Figure 7:
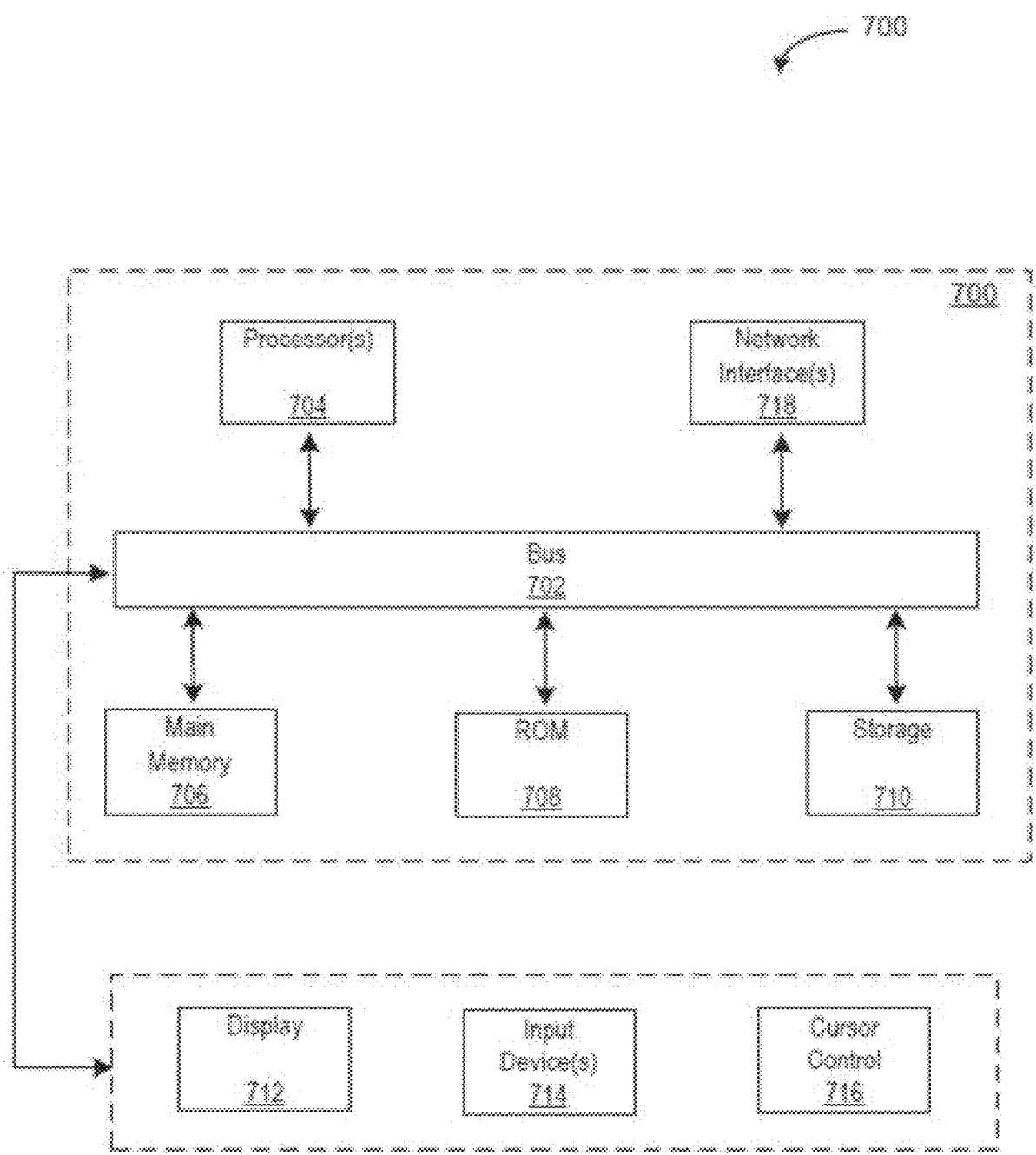
FIG. 7 is a block diagram of an example computer system in which various embodiments described herein may be implemented.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method comprising:
   receiving, at an access point (AP), respective virtual reality (VR) data from each of a plurality of untethered mobile devices associated with a multi-user VR environment;
   receiving, at the AP, an indication of an atomic data block size for data to be transmitted to one or more of the plurality of untethered mobile devices;
   reducing, by the AP and based on the indication, a transmission duration of a VR data block to be transmitted to the one or more of the plurality of untethered mobile devices, wherein reducing the transmission duration of the VR data block comprises reducing the transmission duration fitting the atomic data block size without introducing transmission delays to one or more other devices of the plurality of untethered mobile devices;
   determining physical movement of an untethered mobile device of the plurality of untethered mobile devices, wherein determining the physical movement of the untethered mobile device comprises predicting at least a portion of the physical movement based on a context of historical VR interactions performed by a user of the untethered mobile device; and
   performing rate control for the untethered mobile device based on the determined physical movement.

2. The method of claim 1, further comprising:
   identifying a multi-user multiple input multiple output (MU-MIMO) grouping associated with a subframe error rate (SFER) above a threshold; and
   blacklisting the identified MU-MIMO grouping.

3. The method of claim 2, further comprising:
   determining that the threshold has increased;
   determining that the SFER associated with the MU-MIMO grouping is no longer above the threshold after the increase; and
   removing the MU-MIMO grouping from the blacklisting.

4. The method of claim 1, further comprising:
   grouping the untethered mobile device into a MU-MIMO group based on the determined physical movement.

5. The method of claim 1, further comprising:
   sending uplink metadata using Bluetooth.

6. The method of claim 1, further comprising:
   inserting a silent slot or a delay when a queue length of downlink traffic is short.

7. The method of claim 1, further comprising:
   scheduling VR metadata for all untethered mobile devices associated with the AP in a single uplink orthogonal frequency-division multiple access (OFDMA) frame, without requiring buffer status reports.

8. The method of claim 1, wherein performing the rate control comprises using data indicative of the predicted physical movement to prevent packet loss due to signal fading associated with the physical movement.

9. The method of claim 1, further comprising:
   training a machine learning model to predict an optimal polygon complexity, the optimal polygon complexity comprising an optimal number of vertices to use to represent an object to be rendered within the multi-user VR environment based on data contained in the VR data block;
   determining a distance from the untethered mobile device to the object in the multi-user VR environment;
   receiving, at the trained machine learning model, the distance as input; and
   outputting, by the trained machine learning model, the optimal number of vertices.

10. An access point comprising at least:
    a memory;
    a central processing unit (CPU) executing instructions from the memory to:
    receive respective virtual reality (VR) data from each of a plurality of untethered mobile devices associated with a multi-user VR environment;
    receive an indication of an atomic data block size for data to be transmitted to one or more of the plurality of untethered mobile devices;
    reduce, based on the indication, a transmission duration of a VR data block to be transmitted to the one or more of the plurality of untethered mobile devices, wherein reducing the transmission duration of the VR data block comprises reducing the transmission duration fitting the atomic data block size without introducing transmission delays to one or more other devices of the plurality of untethered mobile devices;
    determine physical movement of an untethered mobile device of the plurality of untethered mobile devices, wherein determining the physical movement of the untethered mobile device comprises predicting at least a portion of the physical movement based on a context of historical VR interactions performed by a user of the untethered mobile device; and
    perform rate control for the untethered mobile device based on the determined physical movement.

11. The access point of claim 10, the instructions further configured to:
    identify a multi-user multiple input multiple output (MU-MIMO) grouping associated with a subframe error rate (SFER) above a threshold; and
    blacklist the identified MU-MIMO grouping.

12. The access point of claim 10, the instructions further configured to:
    group the untethered mobile device into a MU-MIMO group based on the determined physical movement.

13. The access point of claim 10, the instructions further configured to:
    send uplink metadata using Bluetooth.

14. The access point of claim 10, the instructions further configured to:

insert a silent slot or a delay when a queue length of downlink traffic is short.

15. The access point of claim 10, the instructions further configured to:
schedule VR metadata for all untethered mobile devices associated with the AP in a single uplink orthogonal frequency-division multiple access (OFDMA) frame, without requiring buffer status reports.

16. A non-transitory computer-readable storage medium encoded with instructions executable by a main processor of central processing unit (CPU) of a wireless access point (WAP), the CPU comprising at least the main processor and a plurality of co-processors, the non-transitory machine-readable storage medium comprising instructions to:
receive respective virtual reality (VR) data from each of a plurality of untethered mobile devices associated with a multi-user VR environment;
receive an indication of an atomic data block size for data to be transmitted to one or more of the plurality of untethered mobile devices;
reduce, based on the indication, a transmission duration of a VR data block to be transmitted to the one or more of the plurality of untethered mobile devices, wherein reducing the transmission duration of the VR data block comprises reducing the transmission duration fitting the atomic data block size without introducing transmission delays to one or more other devices of the plurality of untethered mobile devices;
determine physical movement of an untethered mobile device of the plurality of untethered mobile devices, wherein determining the physical movement of the untethered mobile device comprises predicting at least a portion of the physical movement based on a context of historical VR interactions performed by a user of the untethered mobile device; and
perform rate control for the untethered mobile device based on the determined physical movement.

17. The non-transitory computer-readable storage medium of claim 16, the instructions further configured to:
identify a multi-user multiple input multiple output (MU-MIMO) grouping associated with a subframe error rate (SFER) above a threshold; and
blacklist the identified MU-MIMO grouping.

18. The non-transitory computer-readable storage medium of claim 16, the instructions further configured to:
send uplink metadata using Bluetooth.

19. The non-transitory computer-readable storage medium of claim 16, the instructions further configured to:
insert a silent slot or delay when a queue length of downlink traffic is short.

20. The non-transitory computer-readable storage medium of claim 16, the instructions further configured to:
schedule VR metadata for all untethered mobile devices associated with the AP in a single uplink orthogonal frequency-division multiple access (OFDMA) frame, without requiring buffer status reports.

\* \* \* \* \*